United States Patent
Skalkowski et al.

(10) Patent No.: US 10,657,127 B2
(45) Date of Patent: *May 19, 2020

(54) DISTRIBUTED JOINS IN A DISTRIBUTED DATABASE SYSTEM

(71) Applicant: SAP SE, Walldorf (DE)

(72) Inventors: Kornel Skalkowski, Cracow (PL); Youssef Hatem, Walldorf (DE); Stephan Kessler, Walldorf (DE); Christian Mathis, Walldorf (DE)

(73) Assignee: SAP SE, Walldorf (DE)

( * ) Notice: Subject to any disclaimer, the term of this patent is extended or adjusted under 35 U.S.C. 154(b) by 482 days.

This patent is subject to a terminal disclaimer.

(21) Appl. No.: 15/362,586

(22) Filed: Nov. 28, 2016

(65) Prior Publication Data

US 2018/0150521 A1    May 31, 2018

(51) Int. Cl.
  *G06F 16/2453*    (2019.01)
  *G06F 16/22*    (2019.01)
  *G06F 16/2455*    (2019.01)

(52) U.S. Cl.
  CPC .... *G06F 16/24544* (2019.01); *G06F 16/2282* (2019.01); *G06F 16/2455* (2019.01)

(58) Field of Classification Search
  CPC ........... G06F 16/24544; G06F 16/2282; G06F 16/2455
  See application file for complete search history.

(56) References Cited

U.S. PATENT DOCUMENTS

| 5,588,150 A * | 12/1996 | Lin | G06F 16/2471 |
| | | | 707/774 |
| 2014/0244701 A1* | 8/2014 | Welton | H04L 67/1097 |
| | | | 707/827 |

(Continued)

OTHER PUBLICATIONS

"Spark SQL, DataFrames and Datasets Guide." Spark SQL and DataFrames—Spark 2.1.0 Documentation. N.p., n.d. Web. Jan. 31, 2017. <https://spark.apache.org/docs/latest/sql-programming-guide.html>.

(Continued)

*Primary Examiner* — Matthew J Ellis
(74) *Attorney, Agent, or Firm* — Mintz Levin Cohn Ferris Glovsky and Popeo, P.C.

(57) ABSTRACT

In one respect, there is provided a distributed database system that includes hosts configured to store and/or manage data, a first query processing engine comprising a master node and an executor node, and a second query processing engine. The master node can be implemented on programmable processors and configured to perform operations. The operations can include: offloading, to the second query processing engine, a creation of a first and a second table such that the first and the second table are partitioned by the second query processing engine; generating an execution plan for a query on data in the distributed database system, the execution plan including a distributed join operation that combines data from the first and second table; determining to push down, to the second query processing engine, the (Continued)

distributed join operation; and dispatching, to the executor node, a portion of the execution plan including the distributed join operation.

20 Claims, 4 Drawing Sheets

(56) References Cited

U.S. PATENT DOCUMENTS

| | | | |
|---|---|---|---|
| 2015/0134795 A1* | 5/2015 | Theimer | G06F 16/254 709/223 |
| 2015/0242788 A1* | 8/2015 | Wu-Emmert | G06Q 10/06316 705/7.26 |
| 2015/0319234 A1* | 11/2015 | Wang | H04L 67/1025 709/226 |
| 2016/0217182 A1* | 7/2016 | Mindnich | G06F 16/24544 |
| 2016/0306849 A1* | 10/2016 | Curino | G06F 16/24542 |
| 2018/0011905 A1* | 1/2018 | Liu | G06F 16/24554 |

OTHER PUBLICATIONS

Armbrust, Michael, et al. "Spark sql: Relational data processing in spark." Proceedings of the 2015 ACM SIGMOD International Conference on Management of Data. ACM, 2015.

Borthakur, Dhruba. "HDFS architecture guide." Hadoop Apache Project 53 (2008).

Zaharia, Matei, et al. Resilient distributed datasets: A fault-tolerant abstraction for in-memory cluster computing. Technical Report UCB/EECS-2011-82, EECS Department, University of California, Berkeley, 2011.

* cited by examiner

DISTRIBUTED JOINS IN A DISTRIBUTED DATABASE SYSTEM

FIELD

The present disclosure generally relates to database processing and, more specifically, to the integration of multiple query processing engines in a distributed database system.

BACKGROUND

Data in a distributed database system is stored across a multitude of physically and/or logically distinct hosts. For example, data in a distributed database system may be stored on different host computers. Alternately or additionally, data in a distributed database system may be managed by separate host processes. To fulfill a query in a distributed database system, a query processing engine may generate an execution plan setting forth the data processing operations (e.g., join, aggregation, filter, relation) required by the query. The query processing engine may further distribute portions of the execution plan to the appropriate hosts, thereby delegating the data processing operations to the hosts storing and/or managing the relevant data.

SUMMARY

Methods, systems, and articles of manufacture, including computer program products, are provided for query processing in a distributed database system. In some implementations of the current subject matter, there is provided a distributed database system that includes hosts configured to store and/or manage data. The distributed database system can further include a first query processing engine comprising a master node and an executor node, and a second query processing engine. The master node can be implemented on programmable processors and configured to perform operations. The operations can include: offloading, to the second query processing engine, a creation of a first and a second table such that the first and the second table are partitioned by the second query processing engine; generating an execution plan for a query on data in the distributed database system, the execution plan including a distributed join operation that combines data from the first and second table; determining to push down, to the second query processing engine, the distributed join operation; and dispatching, to the executor node, a portion of the execution plan including the distributed join operation.

In some variations, one or more of the features disclosed herein including the following features can optionally be included in any feasible combination. The second query processing engine can be configured to partition, in accordance to a data partition function, data from the first table and the second table. The partitioning of the data from the first table and the second table in accordance to the data partitioning function can enable a loading of corresponding data from the first table and the second table onto a same instance of the second query processing engine.

In some variations, pushing down the distributed join operation includes rewriting the distributed join operation in structured query language (SQL). The executor node can be deployed at a same host as an instance of the second query processing engine. The executor node can be configured to forward, to the instance of the second query processing engine, the distributed join operation that is pushed down to the second query processing engine, and the instance of the second query processing engine can be configured to perform the distributed join operation. The instance of the second query processing engine can perform the distributed join operation by at least combining portions of the first table and the second table that are loaded onto the instance of the second query processing engine. The instance of the second query processing engine can perform the distributed join operation without shuffling data to and/or from another instance of the second query processing engine.

In some variations, the master node can determine to offload the creation of the first table and the second table to the second query processing engine, when the master node determines that the second query processing engine supports data partitioning. The master node can determine, via an application programming interface (API), that the second query processing engine supports data partitioning. The first query processing engine can be a distributed query processing engine while the second query processing engine can be a distributed query processing engine or a non-distributed query processing engine.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

A distributed database system can include a distributed query processing engine adapted to handle queries on data stored at and/or managed by a plurality of different hosts in the distributed database system. For example, the distributed database system can include an Apache Spark™ (available from Apache Software Foundation of Forest Hill, Md.) cluster computer framework, which can be configured to respond to a query on data stored in the distributed database system. A master node of the distributed query processing engine can generate an execution plan for the query and dispatch portions of the execution plan to executor nodes deployed at each host in the distributed database system. But data in a distributed database system is generally distributed across the hosts in a pseudorandom manner. Thus, additional time and computing resources may be required to shuffle data between different hosts in order to fulfill a query.

In some implementations of the current subject matter, a distributed database system may include an integrated query processing engine. The integrated query processing engine may include a first query processing engine and a second query processing engine. The first query processing engine may be a distributed query processing engine such as Apache Spark™ and/or the like. Meanwhile, the second query processing engine may be a distributed or non-distributed query processing engine such as the HANA Vora™ query processing engine (available from SAP SE of Walldorf, Germany). According to some implementations of the current subject matter, the second query processing engine may be more efficient than the first query processing engine at partitioning data for storage and/or management across a plurality of different hosts. In particular, the second query processing engine may be able to partition data in a manner that preserves locality between data from different tables.

In some implementations of the current subject matter, preserving the locality of data can optimize the execution of a query (e.g., decrease the required time and computing resources) by expediting at least some data processing operations associated with the query including, for example, distributed join operations that combine data from one or more tables in the distributed database system. For example, when the data required by a distributed join operation all reside on a same host, the distributed join operation can be performed with no or minimal shuffling of data to and from other hosts. Moreover, when the data required by the distributed join operation all reside on the same host, the distributed join operation can be pushed down to the second query processing engine such that the distributed join operation is performed by the second query processing engine instead of the first query processing engine. According to some implementations of the current subject matter, the second query processing engine may be more efficient (e.g., faster, lower memory requirement) than the first query processing engine in executing data processing operations such as a join operation and/or the like. Thus, pushing down one or more data processing operations to the second query processing engine may further optimize the execution of the corresponding query.

In some implementations of the current subject matter, the second query processing engine may provide one or more extension points that enable access to at least some of the functionalities of the second query processing engine. For example, the extension points may include an API that exposes one or more functionalities of the second query processing engine including, for example, the data partitioning functionality of the second query processing engine. The first query processing engine may determine, via the extension points, the capabilities of the second query processing engine. According to some implementations of the current subject matter, the first query processing engine may determine whether the second query processing engine supports data partitioning. The first query processing engine may offload the partitioning of data, when the second query processing engine is determined to support data partitioning.

Figure 1:
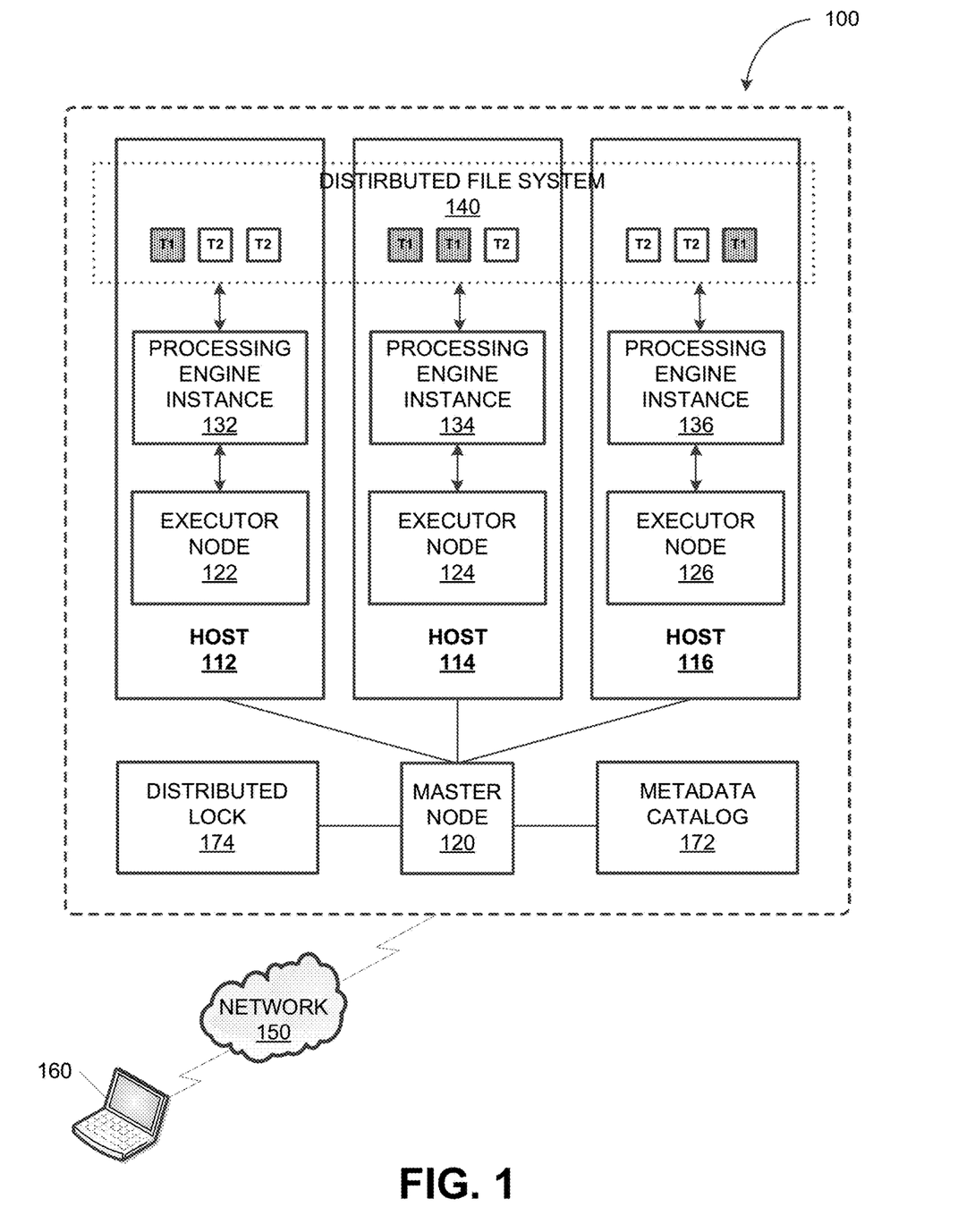
FIG. 1 depicts a block diagram illustrating a distributed database system consistent with implementations of the current subject matter.

FIG. 1 depicts a block diagram illustrating a distributed database system 100 consistent with implementations of the current subject matter. Referring to FIG. 1, the distributed database system 100 may include a plurality of hosts including, for example, a first host 112, a second host 114, and a third host 116. The distributed database system 100 may further include a distributed file system 140 (e.g., a Hadoop distributed file system (HDFS)). It should be appreciated that the distributed database system 100 can include a different number of hosts than shown without departing from the scope of the present disclosure.

In some implementations of the current subject matter, the distributed database system 100 can further include an integrated query processing engine that includes a first query processing engine and a second query processing engine. The first query processing engine may be a distributed query processing engine (e.g., Apache Spark™) that includes a master node 120 and a plurality of executor nodes deployed at each host in the distributed database system 100. For instance, as shown in FIG. 1, the first query processing engine can include a first executor node 122, a second executor node 125, and a third executor node 126. The first executor node 122 can be deployed at the first host 112, the second executor node 124 can be deployed at the second host 114, and the third executor node 126 can be deployed at the third host 116.

The first executor node 122, the second executor node 124, and the third executor node 126 can be communicatively coupled with the master node 120. For example, the master node 120 may delegate data processing operations by dispatching portions of an execution plan to the first executor node 122, the second executor node 124, and/or the third executor node 126. It should be appreciated that the first query processing engine may include a different number of executor nodes without departing from the scope of the present disclosure.

In some implementations of the current subject matter, the second query processing engine can be a distributed or a non-distributed query processing engine (e.g., SAP HANA Vora™). The distributed database system 100 can include a plurality of instances of the second query processing engine including, for example, a first processing engine instance 132, a second processing engine instance 134, and a third processing engine instance 136. As shown in FIG. 1, the first processing engine instance 132 can be deployed at the first host 112, the second processing engine instance 134 can be deployed at the second host 114, and the third processing engine instance 136 can be deployed at the third host 116.

According to some implementations of the current subject matter, the first query processing engine and the second query processing engine can be integrated such that the second query processing engine performs at least some data processing operations instead of the first query processing engine. For example, the second query processing engine may be able to partition data in a manner that preserves the locality of the data. Thus, the second query processing engine may perform data partitioning instead of the first query processing engine. Similarly, the second query processing engine may be able to perform join operations in a more efficient manner. For instance, a distributed join operation that combines data from multiple tables may be expedited by pushing the distributed join operation down to the second query processing engine, when data required for the distributed join operation all reside on instances of the second query processing engine.

In some implementations of the current subject matter, the first query processing engine may determine the capabilities of the second query processing engine via one or more extension points (e.g., APIs). For example, the master node 120 of the first query processing engine may determine whether the second query processing engine supports data partitioning. If the first query processing engine determines that the second query processing engine supports data partitioning, the first query processing engine may offload the partitioning of data to the second query processing engine.

As noted above, the second query processing engine may be able to partition data in a manner that preservers the locality of the data. As shown in FIG. 1, data in the distributed file system 140 may be stored at and/or managed by the first host 112, the second host 114, and the third host 116. As such, data from the same table may be stored at and/or managed by multiple hosts. For instance, data for a first table T1 and a second table T2 may be stored at and/or managed by the first host 112, the second host 114, and the third host 116. The second query processing engine may partition data by applying the same partitioning function when loading data for both the first table T1 and the second table T2 onto the first processing engine instance 132, the second processing engine instance 134, and/or the third processing engine instance 136. In doing so, corresponding data from the first table T1 and the second table T2 may be loaded onto the same instance of the second query processing engine.

In some implementations of the current subject matter, preserving the locality of the data can optimize the execution of a query on the data by obviating the shuffling of data between two or more hosts. For instance, a distributed join operations that requires corresponding data from both the first table T1 and the second table T2 may be executed without shuffling portions of the first table T1 and the second table T2 between the first host 112, the second host 114, and/or the third host 116. Furthermore, preserving the locality of the data may enable at least some data processing operations required by a query to be pushed down to the second query processing engine. The second query processing engine may be able to execute at least some data processing operations more efficiently than the first query processing engine. For example, the second query processing engine may be able to perform the distributed join operation more efficiently, when the data required by the distributed join operation is already loaded onto the second query processing engine. As such, pushing down at least some data processing operations to the second query processing engine may further optimize the execution of the query.

In some implementations of the current subject matter, the distributed database system 100 may further include a metadata catalog 172. The first query processing engine and/or the second query processing engine may be configured to maintain data loaded from the distributed file system 140 in memory for as long as possible in order to expedite subsequent queries on the same data. Thus, the metadata catalog 172 may track the locations (e.g., the executor nodes of the first query processing engine and/or the instances of the second query processing engine) that have been loaded with data from the distributed file system 140. According to some implementations of the current subject matter, a data processing operation (e.g., a distributed join operation) may be pushed down to one or more instances of the second query processing engine if the data required by the data processing operation is already loaded onto instances of the second query processing engine.

As shown in FIG. 1, the distributed database system 100 can include a distributed lock 174 adapted to provide state synchronization. The distributed lock 174 can be obtained exactly prior to executing a query in order to serialize parallel query executions. Obtaining the distributed lock 174 may be required when the query modifies in-memory data. For example, the query may include a DROP, CREATE, and/or LOAD statement that alters data that is loaded onto the first query processing engine and/or the second query processing engine.

In some implementations of the current subject matter, the distributed lock 174 can be allocated based on the data affected by a query. For instance, the query can be analyzed to determine that the query operates on the first table T1 and the second table T1. The distributed lock 174 may be obtained for the first table T1 by writing T1 to a key-value store. According to some implementations of the current subject matter, the key-value store may be a data structure (e.g., Redis, ZooKeeper, Consul) that supports simultaneous access. If the key-value store does not already contain an entry for the first table T1, then the distributed lock 174 can be successfully obtained for executing the query with respect to the first table T1. The entry T1 can be removed from the key-value store upon completion of the query. By contrast, if the entry T1 already exists in the key-value store, then the distributed lock 174 is already in use (e.g., for another query). As such, the execution the query can be delayed until the entry T1 is removed from the key-value store when the distributed lock 174 is released.

When the distributed lock 174 is successfully obtained for the first table T1, the distributed lock 174 for the second table T2 can be obtained in a same or similar manner as the distributed lock for the first table T1. But if the distributed lock 174 cannot be obtained for the second table T2, the distributed lock 174 for the first table T1 is required to be released. Moreover, the names of tables are sorted in the key-value store prior to locking multiple tables (e.g., both the first table T1 and the second table T2) in order to avoid dead-lock scenarios where the distributed lock 174 for multiple tables are held separately.

Although the integrated query processing engine is shown to include two query processing engines, it should be appreciated that the integrated query processing engine may include additional distributed and/or non-distributed query processing engines without departing from the scope of the present disclosure.

In some implementations of the current subject matter, a user (e.g., of the user device 160) may wish to create and execute a distributed join operation that combines a first table Attendee (Name, City, Age) and a second table Country (Name, City). As such, the user can first define a partitioning function h using the following statement:
CREATE PARTITION FUNCTION h (String) AS HASH USING com.sap.spark.vora Applying the partitioning function h may distribute data from a table across different hosts (e.g., the first host 112, the second host 114, and/or the third host 116). In this example, the partitioning function h is a hash function that partitions the rows in a table based on a hash value of one or more columns in a table. Alternately and/or additionally, the partitioning function h can be range function that maps various ranges of data from a table to different hosts (e.g., the first host 112, the second host 114, and/or the third host 116). The user can define the partitioning function h as a range function using the following statement:
CREATE PARTITION FUNCTION h (integer) SPLITTERS (5, 10, 12)

The user can subsequently create the first table Attendee using the following statement:
CREATE TABLE ATTENDEE (Name String, City String, Age Int) PARTITIONED BY h(City) USING com.sap.spark.vora The statement above enables the user to access the data partitioning functionality of the second query processing engine (e.g., SAP HANA Vora™). Specifically, the first query processing engine (e.g., Apache Spark™) can respond to this statement by offloading the creation of the first table Attendee to the second query processing engine. As such, the second query processing engine can create the first table Attendee and partition data from the table Attendee amongst the first processing engine instance 132, the second processing engine instance 134, and/or the third processing engine instance 136 in accordance with the hash function h.

Similarly, the user can create the second table Country using the following statement:
CREATE TABLE COUNTRY (Name, String, City String) PARTITIONED BY h(City) USING com.sap.spark.vora The first query processing engine can also respond to this statement by offloading the creation of the second table Country to the second query processing engine. In doing so, the second query processing engine can create the second table Country and partition data from the second table Country amongst the first processing engine instance 132, the second processing engine instance 134, and/or the third processing engine instance 136 in accordance with the same hash function h.

In some implementations of the current subject matter, applying the same hash function h when partitioning data from different tables enables corresponding portions of the first table Attendee and the second table Country to be loaded onto the same instances of the second query processing engine. For example, the first table Attendee may include the following entries:
("Mike", "San Francisco", 20)
("George", "San Francisco", 33)
("Jill", "Waldorf", 25)
("Phill", "Waterloo", 28)
("Evan", "Moscow", 44)
("Suzan", "New York", 22)
("Bob", "Berlin", 30)

The second query processing engine may partition the first table Attendee and the second table Country based on the hash function h such that entries from the first table for attendees from the same city and a corresponding entry for that city from the second table are loaded into the same instance of the second query processing engine. For instance, the entries from the first table Attendee for Mike and George, who are both from San Francisco, may be loaded into the first processing engine instance 132. In addition, the entry for the city of San Francisco from the second table Country may also be loaded onto the first processing engine 132. Meanwhile, the entry from the first table Attendee for Suzan from New York and the entry from the second table Country for the city of New York may both be loaded onto the second processing engine instance 134.

Figure 2:
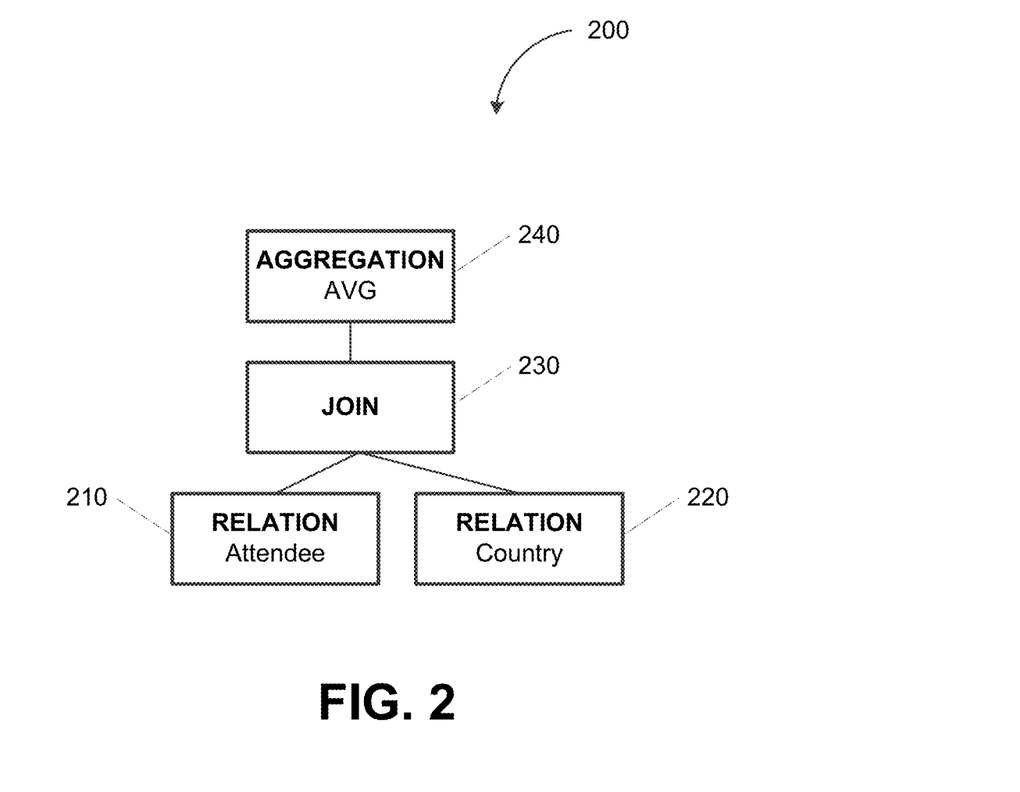
FIG. 2 depicts an example of an execution plan consistent with implementations of the current subject matter.

Once the first table Attendee and the second table Country have been created by the second query processing engine, the user can query data from the first table and/or the second table. For example, the user can issue the following SQL statement, which requires data from both the first table and the second table:
SELECT COUNTRY.Name, AVG (Age) FROM COUNTRY, ATTENDEE
WHERE ATTENDEE. City=COUNTRY. City FIG. 2 depicts an example of an execution plan 200 consistent with implementations of the current subject matter. Referring to FIGS. 1-2, the master node 120 of the first query processing engine can respond to the above SQL statement by generating the execution plan 200. The execution plan 200 can include a plurality of data processing operations, which can be performed by the first query processing engine and/or the second query processing engine. For instance, the execution plan 200 may include a first data processing operation 210 for loading the first table Attendee and a second data processing operation 220 for loading the second table Country. The execution plan 200 may further include a third data processing operation 230, which can be a distributed join operation that combines data from the first table Attendee and the second table Country. In addition, the execution plan 200 may include a fourth data processing operation 240 that aggregates the result of the third data processing operation 230 (e.g., the distributed join operation) by averaging the result.

As shown in FIG. 2, the execution plan 200 can have a tree structure having nodes that correspond to each of the data processing operations required by the execution plan 200. Thus, in some implementations of the current subject matter, executing the query associated with the execution plan 200 can include traversing the tree structure corresponding to the execution plan 200 and executing each of the data processing operations from the bottom of the tree structure upward.

According to some implementations of the current subject matter, the first query processing engine may determine whether to push down, to the second query processing engine, at least some of the data processing operations included in the execution plan 200. For example, the first query processing engine may have offloaded the creation of the first table Attendee and the second table Country to the second query processing engine. As such, corresponding portions of the first table and the second table may be already loaded in instances the second query processing engine (e.g., the first processing engine instance 132, the second processing engine instance 134, and/or the third processing engine instance 136). Accordingly, the first query processing engine may determine to push down the third data processing operation (e.g., the distributed join operation).

In some implementations of the current subject matter, pushing down a data processing operation can include rewriting the data processing operation in SQL and sending the data processing operation to the second query processing engine via an API such as a Java Database Connectivity (JDBC) driver and/or the like. Because corresponding portions of the first table Attendee and the second table Country are already loaded onto the same instances of the second query processing engine, the execution plan for the 200 (e.g., the third query processing operation 230) can be performed with no or minimal shuffling of data between the first processing engine instance 132, the second processing engine instance 134, and/or the third processing engine instance 136.

Figure 3:
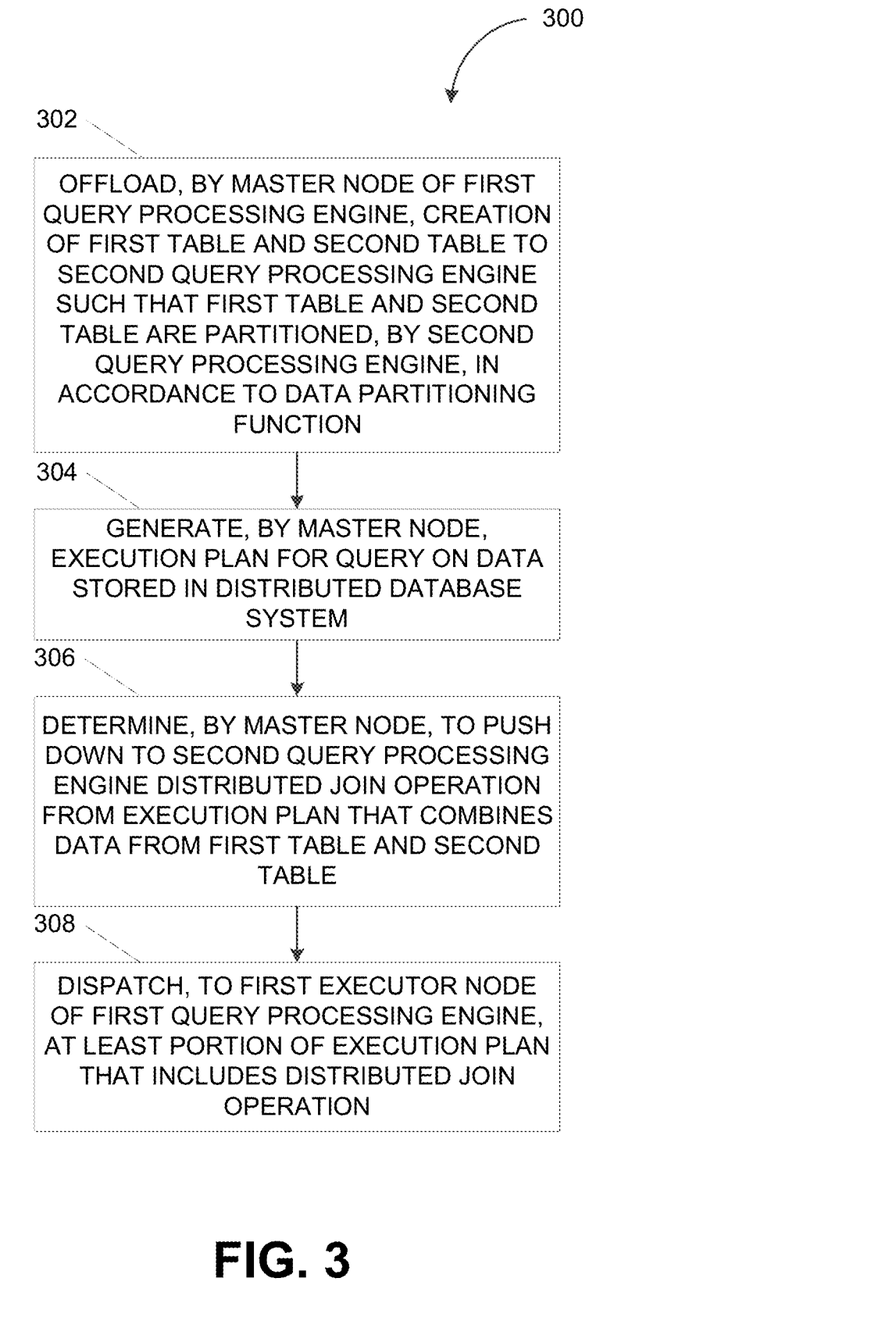
FIG. 3 depicts a flowchart illustrating a process for executing a query consistent with implementations of the current subject matter.

FIG. 3 depicts a flowchart illustrating a process 300 for executing a query consistent with implementations of the current subject matter. Referring to FIGS. 1-3, the process 300 may be performed by the distributed database system 100. For instance, the process 300 may be performed by the master node 120 of the first query processing engine of the integrated query processing engine.

The master node 120 of the first query processing engine can determine to offload, to the second query processing engine, the creation of a first table and a second table such that the first table and the second table are partitioned, by the second query processing engine, in accordance to a data partitioning function (302). For example, the master node 120 of the first query processing engine can determine, via one or more extension points (e.g., APIs), whether the second query processing engine supports data partitioning.

The first query processing engine can offload the partitioning of data to the second query processing engine, when the second query processing engine is determined to support data partitioning. In some implementations of the current subject matter, the second query processing engine can partition data in a manner that preserves the locality between data. For instance, the second query processing engine may create the first table (e.g., Attendee) and the second table (e.g., Country). The first table and the second table may be created and partitioned across instances of the second query processing engine in accordance to a data partitioning function. As such, corresponding portions of the first table and the second table can be loaded onto the same instances of the second query processing engine.

The master node 120 can generate an execution plan for a query on data stored in the distributed database system 100 (304). For example, the master node 120 can receive, from the user device 160, a query for data that is stored in the distributed database system 100. As such, the query may require data that is stored at and/or managed by the first host 112, the second host 114, and/or the third host 116. Moreover, the query can require data from both the first table and the second table. Thus, the master node 120 can respond to the query by generating an execution plan (e.g., the execution plan 200) that includes at least one distributed join operation.

The master node 120 can determine to push down, to the second query processing engine, a distributed join operation from the execution plan that combines data from the first table and the second table (306). For instance, the master node 120 can determine to push down one or more data processing operations to the second query processing engine including, for example, distributed join operations that requires data from tables created and partitioned by the second query processing engine. In some implementations of the current subject matter, the master node 120 may push down one or more data processing operations (e.g., distributed join operations) by rewriting the corresponding portion of the execution plan back to SQL. The data processing operations can be forwarded, via an API (e.g., a JDBC driver), to the appropriate instances of the second query processing engine.

The master node 120 can dispatch, to the first executor node 122 of the first query processing engine, at least a portion of the execution plan that includes the distributed join operation (406). For example, the master node 120 can dispatch portions of the execution plan to the executor node (e.g., the first executor node 122, the second executor node 124, the third executor node 126) that is deployed at the appropriate hosts (e.g., the first host 112, the second host 114, the third host 116). The executor nodes can perform one or more data processing operations from the execution plan that are not pushed down to the second query processing engine. Meanwhile, the data processing operations (e.g., distributed join operations) that are pushed down to the second query processing engine can be forwarded by the executor node (e.g., via an API such as a JDBC driver and/or the like) for execution by the appropriate instance of the second query processing engine (e.g., the first processing engine instance 132, the second processing engine instance 134, the third processing engine instance 136).

Figure 4:
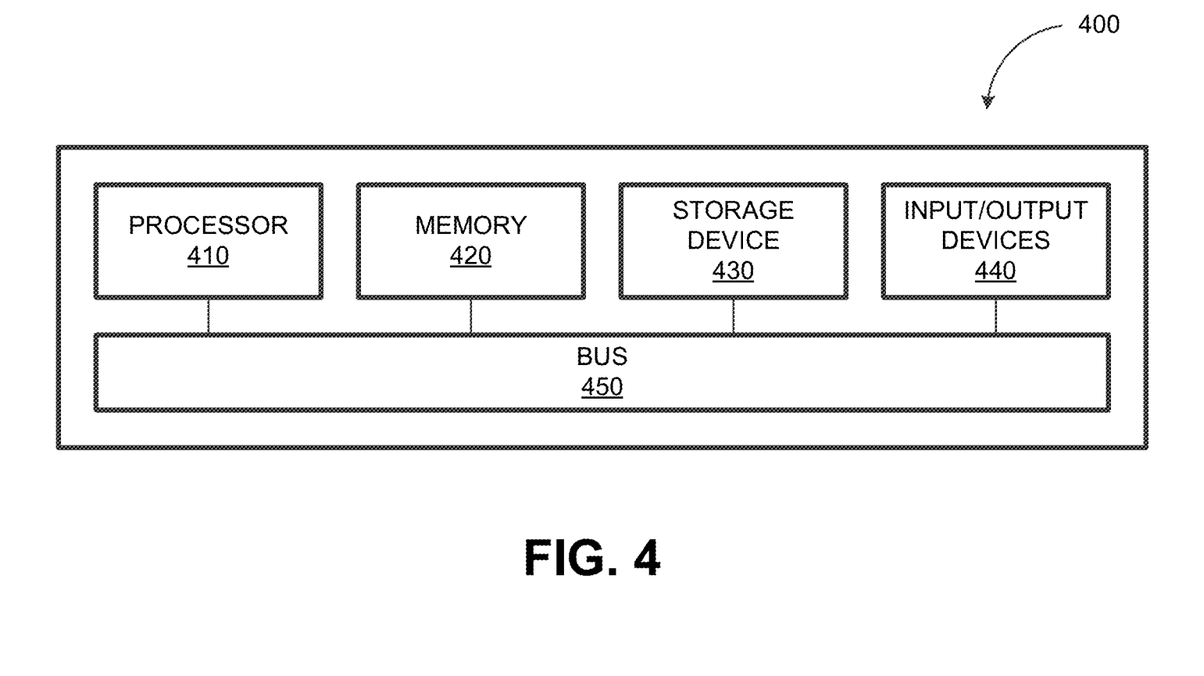
FIG. 4 depicts a block diagram illustrating a computing system consistent with implementations of the current subject matter.

FIG. 4 depicts a block diagram illustrating a computing system 400 consistent with implementations of the current subject matter. Referring to FIGS. 1 and 5, the computing system 400 can be used to implement the distributed database system 100 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the distributed database system 100. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A distributed database system, comprising:
a first host and a second host configured to store data;
a first query processing engine comprising a master node and an executor node deployed at the first host; and
a second query processing engine including a first instance of the second query processing engine deployed at the first host and a second instance of the second query processing engine deployed at the second host; and
wherein the master node of the first query processing engine is implemented on one or more programmable processors and configured to perform operations comprising:
offloading, to the second query processing engine, a creation of a first table and a second table such that the first table and the second table are partitioned by the second query processing engine, the second query processing engine preserving a locality of data from the first table and the second table by at least partitioning the first table and the second table such that a first data from the first table corresponding to a second data from the second table are loaded onto the first instance of the second query processing engine at the first host;
generating an execution plan for a query on data stored at the first host, the execution plan including a distributed join operation that combines data from the first table and the second table;
determining to push down, to the first instance of the second query processing engine at the first host, the distributed join operation; and
dispatching the distributed join operation to the first instance of the second query processing engine by at least sending, to the executor node at the first host, at least a portion of the execution plan including the distributed join operation that is to be pushed down to the first instance of the second query processing engine, the first instance of the second query processing engine performing the distributed join operation without shuffling data between the first instance of the second query processing engine at the first host and the second instance of the second query processing engine at the second host.

2. The distributed database system of claim 1, wherein the second query processing engine is configured to partition, in accordance to a data partition function, data from the first table and the second table.

3. The distributed database system of claim 2, wherein the partitioning of the data from the first table and the second table in accordance to the data partitioning function enables a loading of corresponding data from the first table and the second table onto a same instance of the second query processing engine.

4. The distributed database system of claim 1, wherein pushing down the distributed join operation includes rewriting the distributed join operation in structured query language (SQL).

5. The distributed database system of claim 1, wherein the executor node is configured to forward, to the first instance of the second query processing engine, the distributed join operation that is pushed down to the second query processing engine.

6. The distributed database system of claim 1, wherein the first instance of the second query processing engine performs the distributed join operation by at least combining the first data from the first table and the second data from the second table loaded onto the first instance of the second query processing engine.

7. The distributed database system of claim 1, wherein the master node determines to offload the creation of the first table and the second table to the second query processing engine in response to the master node determining that the second query processing engine supports data partitioning.

8. The distributed database system of claim 7, wherein the master node determines, via an application programming interface (API), that the second query processing engine supports data partitioning.

9. The distributed database system of claim 1, wherein the first query processing engine comprises a distributed query processing engine, and wherein the second query processing engine comprises a distributed query processing engine or a non-distributed query processing engine.

10. A method, comprising:
offloading, by a master node of a first query processing engine in a distributed database system, a creation of a first table and a second table, the creation of the first table and the second table being offloaded to a second query processing engine in the distributed database system, and the second query processing engine preserving a locality of data from the first table and the second table by at least partitioning the first table and the second table such that a first data from the first table corresponding to a second data from the second table are loaded onto a first instance of the second query processing engine at a first host in the distributed database system;
generating, by the master node, an execution plan for a query on data stored at a first host of a plurality of hosts in the distributed database system, the execution plan including a distributed join operation that combines data from the first table and the second table;
determining to push down, to the first instance of the second query processing engine at the first host, the distributed join operation; and
dispatching the distributed join operation to the first instance of the second query processing engine by at least sending, to an executor node of the first query processing engine deployed at the first host, at least a portion of the execution plan including the distributed join operation that is to be pushed down to the second query processing engine, the first instance of the second query processing engine performing the distributed join operation without shuffling data between the first instance of the second query processing engine at the first host and a second instance of the second query processing engine at a second host of the plurality of hosts in the distributed database system.

11. The method claim 10, further comprising:
partitioning, by the second query processing engine, data from the first table and the second table, the partitioning being performed in accordance to a data partitioning function.

12. The method of claim 11, wherein the partitioning of the data from the first table and the second table in accordance to the data partitioning function enables a loading of corresponding data from the first table and the second table onto a same instance of the second query processing engine.

13. The method of claim 10, wherein pushing down the distributed join operation includes rewriting the distributed join operation in structured query language (SQL).

14. The method of claim 10, further comprising:
forwarding, by the executor node at the first host, the distributed join operation that is pushed down to the second query processing engine, the distributed join operation being forwarded to the first instance of the second query processing engine at the first host; and
performing, by the first instance of the second query processing engine, the distributed join operation by at least combining the first data from the first table and the second data from the second table loaded onto the first instance of the second query processing engine.

15. A computer program product comprising a non-transitory machine-readable medium storing instructions that, when executed by at least one programmable processor, cause the at least one programmable processor to perform operations comprising:
offloading, by a master node of a first query processing engine in a distributed database system, a creation of a first table and a second table, the creation of the first table and the second table being offloaded to a second query processing engine in the distributed database system, and the second query processing engine preserving a locality of data from the first table and the second table by at least partitioning the first table and the second table such that a first data from the first table corresponding to a second data from the second table are loaded onto a first instance of the second query processing engine at a first host in the distributed database system;
generating, by the master node, an execution plan for a query on data stored at a first host of a plurality of hosts in the distributed database system, the execution plan including a distributed join operation that combines data from the first table and the second table;
determining to push down, to the first instance of the second query processing engine at the first host, the distributed join operation; and
dispatching the distributed join operation to the first instance of the second query processing engine by at least sending, to an executor node of the first query processing engine deployed at the first host, at least a portion of the execution plan including the distributed join operation that is to be pushed down to the second query processing engine, the first instance of the second query processing engine performing the distributed join operation without shuffling data between the first instance of the second query processing engine at the first host and a second instance of the second query processing engine at a second host of the plurality of hosts in the distributed database system.

16. The computer program product of claim 15, further comprising:

partitioning, by the second query processing engine, data from the first table and the second table, the partitioning being performed in accordance to a data partitioning function.

17. The computer program product of claim 16, wherein the partitioning of the data from the first table and the second table in accordance to the data partitioning function enables a loading of corresponding data from the first table and the second table onto a same instance of the second query processing engine.

18. The computer program product of claim 16, wherein pushing down the distributed join operation includes rewriting the distributed join operation in structured query language (SQL).

19. The computer program product of claim 14, further comprising:
  forwarding, by the executor node at the first host, the distributed join operation that is pushed down to the second query processing engine, the distributed join operation being forwarded to the first instance of the second query processing engine at the first host; and
  performing, by the first instance of the second query processing engine, the distributed join operation by at least combining the first data from the first table and the second data from the second table loaded onto the first instance of the second query processing engine.

20. The computer program product of claim 15, wherein the creation of the first table and the second table is offloaded to the second query processing engine in response to the master node determining that the second query processing engine supports data partitioning.

* * * * *